US012753125B2

(12) United States Patent
Thompson

(10) Patent No.: US 12,753,125 B2
(45) Date of Patent: Oct. 6, 2026

(54) CERAMIC MATRIX COMPOSITE ARTICLE MANUFACTURING

(71) Applicant: General Electric Company, Schenectady, NY (US)

(72) Inventor: Anthony Mark Thompson, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 43 days.

(21) Appl. No.: 18/604,647

(22) Filed: Mar. 14, 2024

(65) Prior Publication Data

US 2025/0289763 A1 Sep. 18, 2025

(51) Int. Cl.

| | |
|---|---|
| ***C04B 35/80*** | (2006.01) |
| ***C04B 35/628*** | (2006.01) |
| *F01D 5/28* | (2006.01) |

(52) U.S. Cl.

CPC ........ *C04B 35/80* (2013.01); *C04B 35/62886* (2013.01); *C04B 2235/616* (2013.01); *F01D 5/282* (2013.01); *F05D 2300/6033* (2013.01)

(58) Field of Classification Search

CPC ............... F01D 5/282; C04B 2235/616; C04B 35/62886; C04B 35/80

See application file for complete search history.

(56) References Cited

U.S. PATENT DOCUMENTS

| | | | | |
|---|---|---|---|---|
| 3,770,539 | A * | 11/1973 | Bullock | B29C 70/08 156/308.6 |
| 3,917,890 | A | 11/1975 | Levy | |
| 5,178,812 | A | 1/1993 | Sanford et al. | |
| 5,242,651 | A | 9/1993 | Brayden et al. | |
| 6,521,296 | B1 | 2/2003 | Seal et al. | |
| 10,322,530 | B2 | 6/2019 | Kawabe | |
| 10,648,065 | B2 | 5/2020 | Coyle et al. | |
| 10,717,681 | B2 | 7/2020 | Landwehr et al. | |
| 11,161,792 | B2 | 11/2021 | Krause et al. | |
| 2008/0210372 | A1 | 9/2008 | Cumings et al. | |
| 2016/0340482 | A1* | 11/2016 | Williams | C08J 5/04 |
| 2017/0008998 | A1* | 1/2017 | Sodano | C08G 18/3846 |
| 2017/0197371 | A1 | 7/2017 | Fetfatsidis et al. | |

OTHER PUBLICATIONS

Kolesnichenko et al., A Versatile Method of Ambient-Temperature Solvent Removal, Organic Process Research & Development, vol. 24, No. 1, 2020, 25-31. https://doi.org/10.1021/acs.oprd.9b00368.

* cited by examiner

*Primary Examiner* — Vishal I Patel

(74) *Attorney, Agent, or Firm* — Dority & Manning, P.A.

(57) ABSTRACT

A method for forming a ceramic matrix composite (CMC) article includes laying up a plurality of plies of a CMC material, sealing the plurality of plies in a vacuum enclosure that is in fluid communication with a solvent supply that includes a volume of solvent, and diffusing a solvent to or from the solvent supply through the plurality of plies.

11 Claims, 6 Drawing Sheets

CERAMIC MATRIX COMPOSITE ARTICLE MANUFACTURING

FIELD

The present disclosure relates to a system and method for forming a ceramic matrix composite (CMC) article.

BACKGROUND

Ceramic matrix composites generally include a ceramic fiber reinforcement material embedded in a ceramic matrix material. The reinforcement material serves as the load-bearing constituent of the ceramic matrix composites in the event of a matrix crack, while the ceramic matrix protects the reinforcement material, maintains the orientation of its fibers, and serves to dissipate loads to the reinforcement material. Of particular interest to high-temperature applications, such as in gas turbines, are silicon-based composites, which include silicon carbide (SiC) as the matrix, the reinforcement material, or both.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
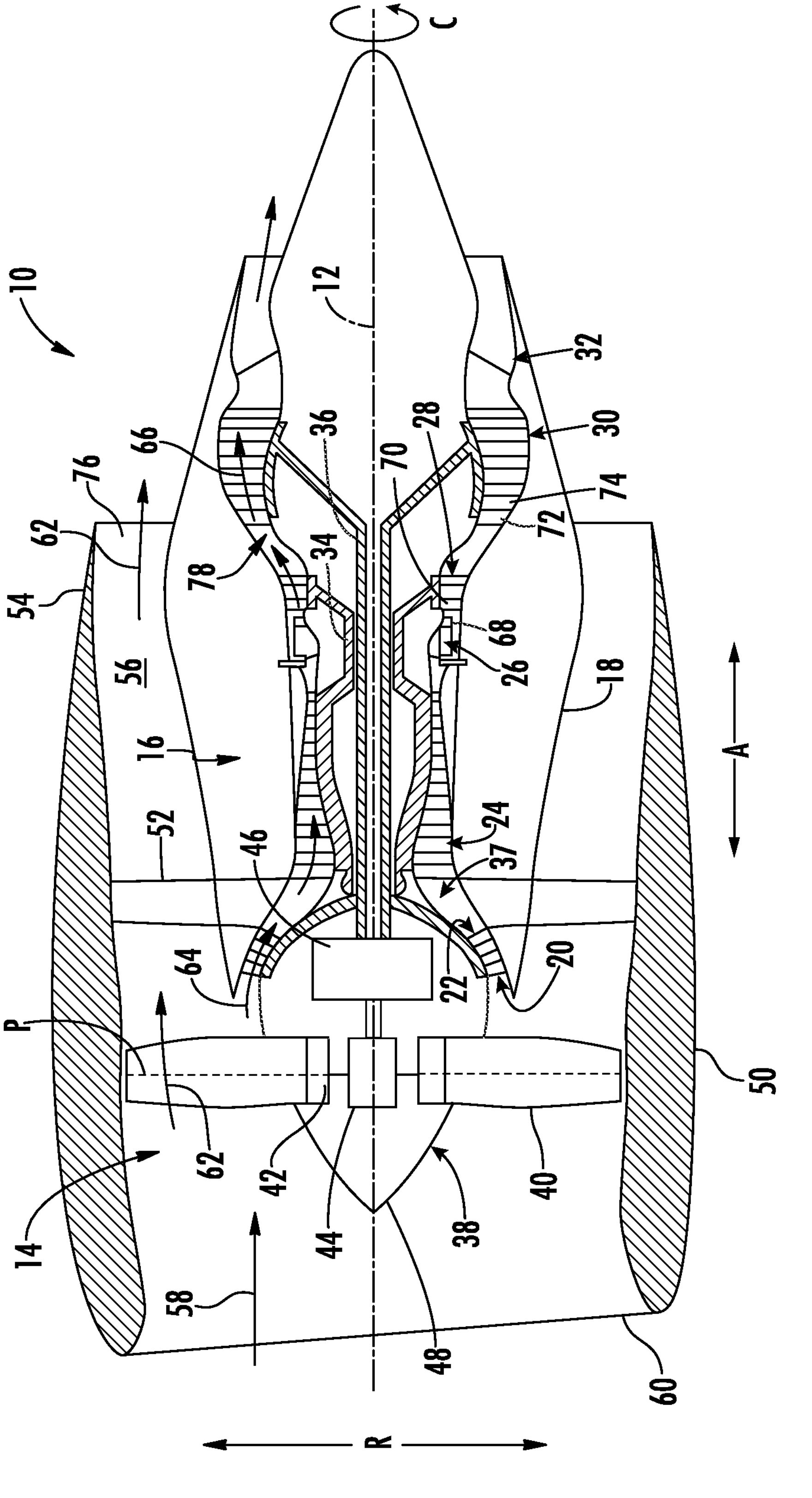
FIG. 1 is a cross-sectional view of an exemplary gas turbine engine.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

As used herein, the terms "first", "second", and "third" may be used interchangeably to distinguish one component from another and are not intended to signify location or importance of the individual components.

The present disclosure is generally related to manufacturing CMC articles. Solvents, such as isopropyl alcohol, toluene, or methyl isobutyl ketone (MIBK)) and furanic resins including furfuryl alcohol, are used when forming CMC articles to provide flexibility to plies of the article and to enable laminate consolidation during later processing steps, such as densification in an autoclave. The solvents may be volatile at ambient air temperatures and pressures, and the solvents may evaporate during the extended layup processes used for large articles, such as combustion liners for aerospace applications. With less solvent, the articles may not consolidate to specified dimensions during a subsequent heating phase.

Preferred materials for the precursor will depend on the particular composition desired for the ceramic matrix of the CMC component, for example, SiC powder or one or more carbon-containing materials if the desired matrix material is SiC processed via a melt infiltration route. Notable carbon-containing materials include carbon black, phenolic resins, and furanic resins, including furfuryl alcohol (CHOCHOH). Other typical slurry ingredients include binders (for example, polyvinylbutyral (PVB)) that promote the pliability of prepreg tapes, and solvents for the binders (for example, isopropanol, toluene, or methyl isobutyl ketone (MIBK)) that promote the fluidity of the slurry to enable impregnation of the fiber reinforcement material.

To improve laminate consolidation, preforms of the CMC article are enclosed in an enclosure that is fluidly connected to a solvent supply. By varying the vacuum pressure in the enclosure, such as by evacuating the enclosure to a specified vacuum pressure, solvent from the solvent supply evaporates and diffuses into the preform when the preform lacks solvent, and solvent diffuses out of the preform when the preform has too much solvent. The solvent supply and the preform may also be heated to further evaporate solvent. By specifying the vacuum pressure and temperatures to which the solvent supply and the preform are exposed and the specific solvent supplied by the solvent supply, the system reaches an equilibrium state at which the amount of solvent in the preform is substantially stable. The preform may then be kept in the enclosure at this equilibrium state until additional processing, such as debulking, is performed, thereby reducing solvent lost to ambient evaporation and improving manufacturing of the CMC article.

Referring now to the drawings, wherein identical numerals indicate the same elements throughout the figures, FIG. 1 is a cross-sectional view of a gas turbine engine in accordance with an exemplary embodiment of the present disclosure. More particularly, for the embodiment of FIG. 1, the gas turbine engine is an aeronautical, turbofan jet engine 10, referred to herein as "turbofan engine 10." The turbofan engine 10 is configured to be mounted to an aircraft, such as in an under-wing configuration or a tail-mounted configuration. As shown in FIG. 1, the turbofan engine 10 defines an axial direction A (extending parallel to a longitudinal centerline provided for reference), a radial direction R, and a circumferential direction (i.e., a direction extending about the axial direction A). The longitudinal centerline 12 defines a longitudinal axis of the turbofan engine 10. In general, the turbofan engine 10 includes a fan section 14 and a turbomachine 16 disposed downstream from the fan section 14 (the turbomachine 16 sometimes also, or alternatively, referred to as a "core turbine engine").

The exemplary turbomachine 16 depicted generally includes a substantially tubular outer casing 18 that defines an annular inlet 20. The outer casing 18 encases, in serial flow relationship, a compressor section including a first, booster or low pressure (LP) compressor 22 and a second, high pressure (HP) compressor 24; a combustion section 26; a turbine section including a first, high pressure (HP) turbine 28 and a second, low pressure (LP) turbine 30; and a jet exhaust nozzle section 32. A high pressure (HP) shaft drivingly connects the HP turbine 28 to the HP compressor 24. A low pressure (LP) shaft 36 drivingly connects the LP turbine 30 to the LP compressor 22. The compressor section, combustion section 26, turbine section, and jet exhaust nozzle section 32 are arranged in serial flow order and together define a core air flowpath 37 through the turbomachine 16. It is also contemplated that the present disclosure is compatible with an engine having an intermediate pressure turbine, e.g., an engine having three spools.

Referring still to the embodiment of FIG. 1, the fan section 14 includes a variable pitch, single stage fan 38, the turbomachine 16 operably coupled to the fan 38 for driving the fan 38. The fan 38 includes a plurality of rotatable fan blades 40 coupled to a disk 42 in a spaced apart manner. As depicted, the fan blades 40 extend outwardly from disk 42 generally along the radial direction R. The fan blades 40, disk 42, and actuation member 44 are together rotatable about the longitudinal centerline 12 by the LP shaft 36 across a power gearbox 46. The power gearbox 46 includes a plurality of gears for stepping down the rotational speed of the LP shaft 36 to a more efficient rotational fan speed. Accordingly, for the embodiment depicted, the turbomachine 16 is operably coupled to the fan 38 through the power gearbox 46.

Referring still to the exemplary embodiment of FIG. 1, the disk 42 is covered by a rotatable front nacelle or hub 48 aerodynamically contoured to promote an airflow through the plurality of fan blades 40. Additionally, the exemplary fan section 14 includes an annular fan casing or outer nacelle 50 that at least partially (and for the embodiment depicted, circumferentially) surrounds the fan 38 and at least a portion of the turbomachine 16.

More specifically, the outer nacelle 50 includes an inner wall 52 and a downstream section 54 of the inner wall 52 of the outer nacelle 50 extends over an outer portion of the turbomachine 16 so as to define a bypass airflow passage 56 therebetween. Additionally, for the embodiment depicted, the outer nacelle 50 is supported relative to the turbomachine 16 by a plurality of circumferentially spaced outlet guide vanes 55. The outer nacelle 50 includes an inlet 60 at a leading edge 61 of the outer nacelle 50.

During operation of the turbofan engine 10, a volume of air 58 enters the turbofan engine 10 through the inlet 60 of the outer nacelle 50, the fan section 14, or both. As the volume of air 58 passes cross the fan blades 40, a first portion 62 of the air 58 is directed or routed into the bypass airflow passage 56, and a second portion 64 of the air 58 is directed or routed into the core air flowpath 37. The pressure of the second portion 64 of air is then increased as it is routed through the HP compressor 24 and into the combustion section 26, where it is mixed with fuel and burned to provide combustion gases 66. The combustion gases 66 are routed from the combustion section 26 through the HP turbine 28. In the HP turbine 28, a portion of energy (such as thermal energy, kinetic energy, or both) from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, thereby supporting operation of the HP compressor 24. The combustion gases 66 are then routed through the LP turbine 30 where a second portion of energy (such as thermal energy, kinetic energy, or both) is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22, rotation of the fan 38, or both.

The combustion gases 66 are subsequently routed through the jet exhaust nozzle section 32 of the turbomachine 16 to provide propulsive thrust. Simultaneously, the pressure of the first portion 62 is substantially increased as the first portion 62 is routed through the bypass airflow passage 56 before it is exhausted from a fan nozzle exhaust section 76 of the turbofan engine 10, also providing propulsive thrust. The HP turbine 28, the LP turbine 30, and the jet exhaust nozzle section 32 at least partially define a hot gas path 78 for routing the combustion gases 66 through the turbomachine 16.

In some exemplary embodiments, the exemplary turbofan engine 10 of the present disclosure may be a relatively large power class turbofan engine 10. Accordingly, when operated at the rated speed, the turbofan engine 10 may be configured to generate a relatively large amount of thrust. More specifically, when operated at the rated speed, the turbofan engine 10 may be configured to generate at least 20,000 pounds of thrust, such as at least about 25,000, 30,000, and up to, e.g., 150,000 pounds of thrust. Accordingly, the turbofan engine 10 may be referred to as a relatively large power class gas turbine engine.

Moreover, the exemplary turbofan engine 10 depicted in FIG. 1 is by way of example only, and that in other exemplary embodiments, the turbofan engine 10 may have any other suitable configuration. For example, in certain exemplary embodiments, the fan may not be a variable pitch fan, the engine may not include a reduction gearbox (e.g., the power gearbox 46) driving the fan, may include any other suitable number or arrangement of shafts, spools, compressors, turbines, etc. Further, although a turbofan engine is depicted in FIG. 1, in other exemplary embodiments, aspects of the present disclosure may be incorporated into any other suitable gas turbine engine, such as a turboprop engine, turboshaft engine, etc.

One or more components of the turbofan engine 10 may be formed of a ceramic matrix composite (CMC) material and include a CMC article. For example, one or more liners of a combustor within the combustion section, one or more stator or rotor airfoils within the HP turbine 28 or LP turbine 30, one or more stator or rotor airfoils elsewhere within the turbofan engine 10, one or more shrouds or flowpath liners, etc. may be formed of a CMC material/include a CMC article.

As used herein, ceramic-matrix-composite or "CMC" refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), silicides (intermetallics) such as niobium silicide and molybdenum silicide, or mixtures thereof.

Generally, particular CMCs may be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs may include a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain embodiments, the reinforcing fibers may be bundled, coated, or both prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing and subsequent chemical processing to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

Figure 2:
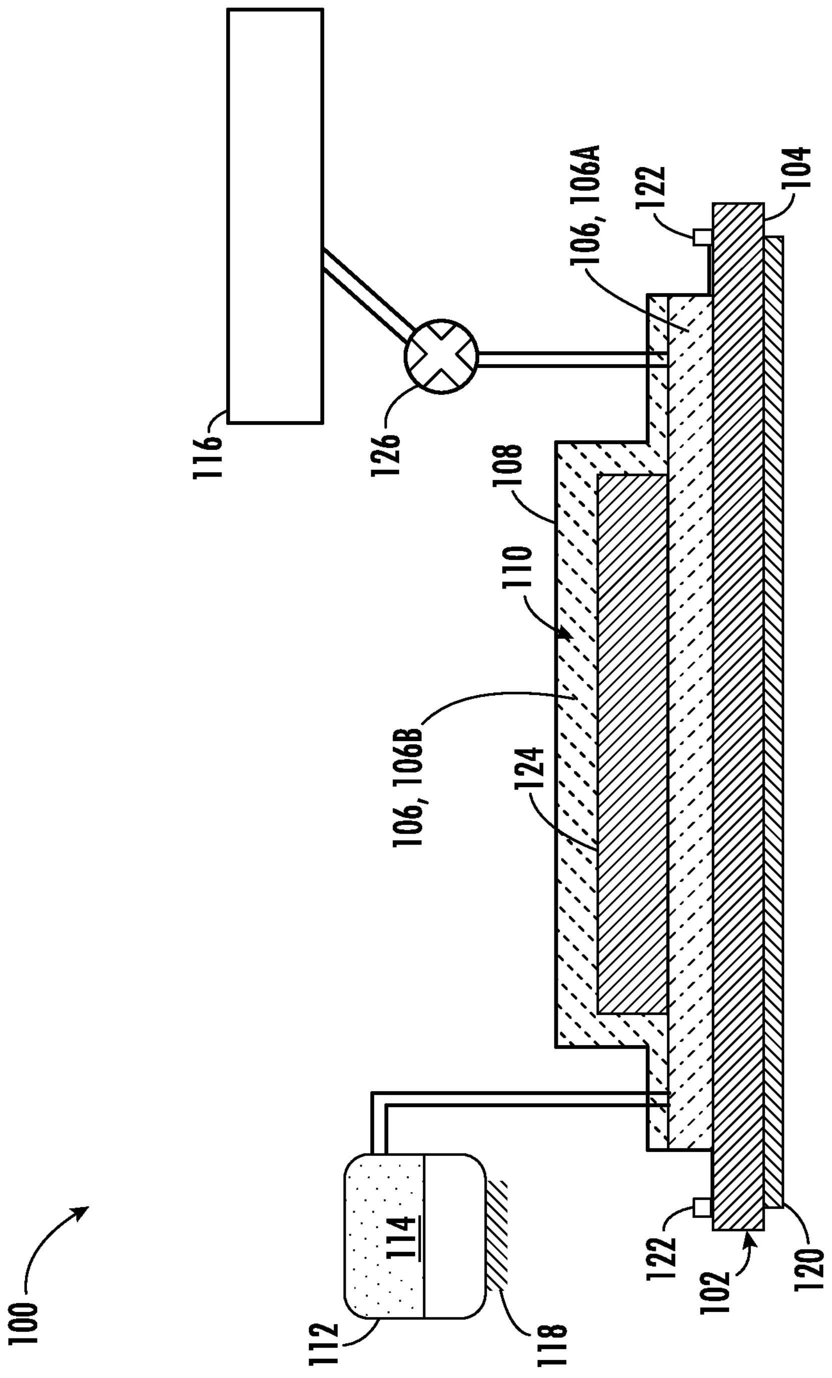
FIG. 2 is a side, cross-sectional view of an exemplary system for forming a CMC article.

Now referring to FIG. 2, a schematic view of a system 100 for forming a CMC article is shown. More specifically, FIG. 2 shows a cross-sectional view of the system 100 illustrating a layup of plies of CMC material and solvent added to the plies in an enclosure.

The system 100 for forming the CMC article includes a tool base 102 having a platform 104 for receiving a plurality of plies of a CMC material, a breather 106, a bag 108 forming an enclosure 110 when secured to the platform 104, and a solvent supply 112 that communicates solvent 114 to and from the enclosure 110. In certain embodiments, the system 100 may include one or more of: a vacuum pump 116 in fluid communication with the enclosure 110, a heater 118 in thermal communication with the solvent supply 112, and a second heater 120 in thermal communication with the platform 104. All of the vacuum pump 116, the heater 118, and the second heater 120 are shown in FIG. 2 for clarity, and it will be appreciated that the system may omit one or more of these components based on the specified method of diffusion of the solvent 114 for the CMC article. The CMC article may be one of a nozzle (such as for the jet exhaust nozzle section 32 or the fan nozzle exhaust section 76), an airfoil (such as for an HP turbine rotor blade 70), or another component of the gas turbine engine 10.

The tool base 102 supports a plurality of plies of a CMC material during formation of the CMC article. The plies are laid up on the platform into a "preform" 124, e.g., a partially-formed article with unprocessed plies of the CMC material. The platform 104 of the tool base 102 is shaped according to the design of the CMC article. In one example, such as is shown in FIG. 2, the platform 104 may be substantially flat for a flat CMC article. In another example (not shown in the FIGS.), the platform 104 may be curved, such as an arc of a circle, to form a curved CMC article.

The system 100 includes the enclosure 110 that encloses the preform 124 on the platform 104. The enclosure 110 is a region between the bag 108 and the platform 104 in which air pressure is adjusted, i.e., a "vacuum pressure" is the pressure of gases (such as air and evaporated solvent 114) in the enclosure 110. More specifically, the bag 108 is fixed or otherwise secured to the platform 104 to form a seal 122 that is airtight and surrounds the preform 124 on the platform 104, enclosing the preform 124 within the enclosure 110. The bag 108 is a suitable material, such as a flexible polymer, to form the seal 122 when secured to the platform 104.

Alternatively, not shown in the FIGS., the bag 108 may enclose the platform 104 and the tool base 102. In such a form, the enclosure 110 completely encapsulates the preform 124, the platform 104, and the tool base 102. The complete encapsulation allows for diffusion of the solvent 114 into the preform 124 when multiple tool bases 102 (not shown) are used to form the CMC article.

The vacuum pump 116 evacuates air from or provides air to the enclosure 110 to attain a specified vacuum pressure within the enclosure 110. As an example, the specified vacuum pressure may be from 5 to 20 kilopascals (kPa) (37.5 to 150 Torr). The specified vacuum pressure may be greater than the equilibrium vapor pressure of the solvent 114 at a specified solvent content of the preform 124 such that the solvent 114 does not diffuse out of the preform 124. A valve 126 may be closed to maintain in the enclosure 110 at the specified vacuum pressure.

The solvent supply 112 provides the solvent 114 to the enclosure 110. The solvent supply 112 is a tank or reservoir that contains the solvent 114 therein. The solvent 114 is a liquid (such as isopropyl alcohol, furfuryl alcohol, or a mixture of both) that reacts with chemicals in the preform 124 to improve flexibility of the plies of the preform 124 and to improve laminate consolidation of the plies. The liquid solvent 114 evaporates in the solvent supply 112 until the solvent 114 reaches the vapor pressure at which vapor solvent 114 is in equilibrium with the liquid solvent 114. Likewise, the solvent 114 in the preform 124 evaporates until the vapor solvent 114 is in equilibrium with the liquid solvent 114 in the preform 124.

When the vapor pressure of the solvent 114 in the solvent supply 112 exceeds the vapor pressure in the enclosure 110, then solvent 114 diffuses from the solvent supply 112 into the enclosure 110. That is, increasing the vapor pressure of the solvent 114 in the enclosure 110 drives the solvent 114 from the solvent supply 112 into the preform 124, increasing the amount of the solvent 114 in the preform 124.

When the vapor pressure of the solvent 114 in the solvent supply 112 is lower than the vapor pressure in the enclosure 110, the solvent 114 diffuses from the enclosure 110 back into the solvent supply 112. Thus, decreasing the vapor pressure of the solvent 114 in the enclosure 110 extracts the solvent 114 out of the preform 124, decreasing the amount of the solvent 114 in the preform 124.

Controlling the vapor pressure of the solvent (thereby controlling diffusion of the solvent 114 into and out from the preform 124) may include controlling: a temperature of the solvent 114, a vacuum pressure of the enclosure 110, a chemical composition of the solvent 114, or combinations thereof. Modifying one or more of the temperature, vacuum pressure, or chemical composition adjusts the vapor pressure of the solvent 144, which initiates diffusion of the solvent 114 until the vapor pressure of the solvent 114 in the solvent supply 112 is substantially equal to the vapor pressure of the solvent 114 in the enclosure 110. In such a state, the vapor pressure of solvent 114 in the system 100 reaches "equilibrium" or an "equilibrium state." The specific temperature, vacuum pressure, chemical composition, or combinations thereof can be determined such that, at the equilibrium state, a specified amount of solvent 114 is provided to or extracted from the preform 124.

Additionally, the solvent 114 may be transmitted from the solvent supply 112 to the preform 124 across the breather 106. As shown in FIG. 2, the breather 106 surrounds the preform 124, and solvent 114 diffuses into the breather 106. The solvent 114 then diffuses from the breather 106 to the preform 124 until the preform 124, the vapor within the enclosure 110, and the breather 106 reach an equilibrium state. The breather 106 can be a suitable material for transmitting the solvent 114, such as a fiber cloth. The breather 106 in FIG. 2 is shown as a two-piece construction with a first breather 106A disposed between the preform 124 and the platform 104 and a second breather 106B disposed between the preform 124 and the bag 108. The first and second breathers 106A, 106B may be placed separately, with the first breather 106A disposed on the platform 104 and the second breather 106B disposed on the first breather 106A and covering the preform 124. It will be appreciated that the breather 106 may have any suitable construction, such as a single-piece construction that encapsulates the preform 124 with a single cloth, or a multi-piece construction that covers different portions of the preform 124.

Additionally or alternatively, to drive the diffusion rate in the enclosure 110, the heater 118 and the second heater 120 each include one or more heating devices or elements (not shown) that provide heat to the solvent supply 112 and to the platform 104. The heater 118 and the second heater 120 may each include one or more electric heaters, combustion heaters, induction heaters, fluid heat exchangers, chemical heaters, radiative heaters, or combinations thereof.

The heater 118 heats the solvent supply 112 to a specified temperature. The specified temperature may be determined such that the vapor pressure of the solvent 114 in the solvent supply 112 is substantially equal to the vapor pressure at the specified level of the solvent 114 in the preform 124, placing the solvent 114 in the equilibrium state.

The solvent 114 diffuses between the preform 124 and the air in the enclosure 110 until the preform 124 and the air in the enclosure 110 reach the equilibrium state. Increasing the temperature of the solvent supply 112 increases the vapor pressure of the solvent 114, which can diffuse more solvent 114 into the preform 124 than when the solvent supply 112 is at ambient temperature. Similarly, the second heater 120 may be actuated to heat the platform 104 to a specified temperature to increase the vapor pressure of the solvent 114 in the enclosure 110 above the preform 124. Thus, in order to provide a specific amount of solvent 114 to the preform 124, the heater 118 is actuated to heat the solvent supply 112 to a first temperature and the second heater 120 is actuated to heat the platform 104 to a second temperature such that the respective vapor pressures of the air in the enclosure 110 and the preform 124 are substantially equal.

Figure 3:
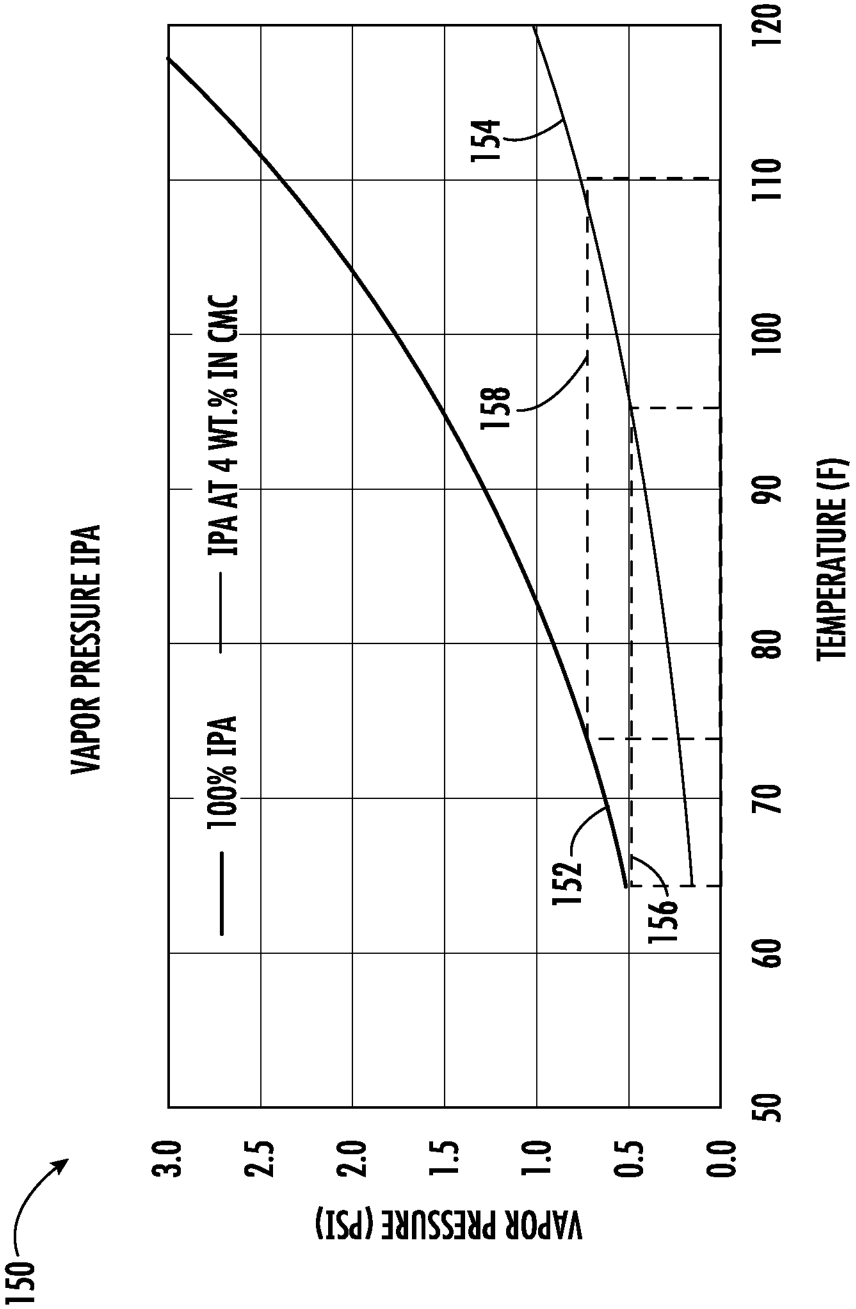
FIG. 3 is an exemplary chart of vapor pressure and temperature for a solvent.

FIG. 3 is a chart 150 that shows a graph 152 of the vapor pressure of the solvent 114 in the solvent supply 112 and a graph 154 of the vapor pressure of the solvent 114 in the preform 124. The vertical axis shows the vapor pressure of the solvent 114 in units of pounds per square inch (psi), and the horizontal axis shows the temperature of the solvent 114 in degrees Fahrenheit (° F.). It will be appreciated that, while the chart 150 uses Imperial units, equivalent SI units (such as kilopascals kPa and degrees Celsius® C.) will be listed to a close approximation.

The vapor pressure of the solvent 114 in the solvent supply 112 and the vapor pressure of the solvent 114 in the preform 124 increase as the temperature of the solvent 114 increases. In an exemplary embodiment, the preform 124 represented by the graph 154 may have 4 weight percent (wt %) of the solvent 114 diffused therein. As shown in the chart 150, to achieve a specified vapor pressure, the temperature of the solvent 114 in the solvent supply 112 and the temperature of the solvent 114 in the preform 124 are different. As an example, for a vapor pressure of 0.5 psi (3.4 kPa), a line 156 shows that the temperature of the solvent in the solvent supply 112 is about 65° F. (18° C.) and the temperature of the solvent 114 in the preform 124 is about 95° F. (35° C.). Thus, when the solvent 114 in the solvent supply 112 reaches 65° F. (18° C.) and the solvent 114 in the preform 124 reaches 95° F. (35° C.), the vapor pressures are substantially equal and the system 100 reaches equilibrium. The solvent 114 diffuses into or out from the preform 124 until the amount of solvent 114 in the preform 124 is 4 wt %.

As another example, for a vapor pressure of about 0.7 psi (4.8 kPa), a line 158 shows that, in the equilibrium state, the temperature of the solvent 114 in the solvent supply 112 is about 75° F. (24° C.) and the temperature of the preform 124 is about 110° F. (43° C.). Having a specified temperature above an ambient air temperature (70-72° F., 20-21° C.) external to the system 100 may be beneficial because the heaters 118, 120 may not be able to cool the solvent supply 112 or the platform 104 to a temperature below the ambient air temperature.

Referring back to FIG. 2, once the preform 124 and the solvent supply 112 have reached the equilibrium state and the solvent 114 has diffused into the preform 124, the vacuum pump 116 evacuates the enclosure 110 to a second vacuum pressure to debulk the preform 124. In this context, to "debulk" the preform 124 means to compress a thickness of the preform 124 to a smaller size. At the second vacuum pressure, air trapped between layers of the preform 124 is removed, and the layers of the preform 124 compress, decreasing the overall size (thickness) of the preform 124. During the debulking process, the preform 124 may be further heated by the second heater 120 to increase evacuation of the air trapped in the preform 124. Following the debulking process, the bag 108 is removed from the platform 104, unsealing the preform 124 from the enclosure 110. After unsealing the preform 124, additional manufacturing may occur, such as laying a second plurality of plies on the debulked preform 124 to form a new preform (not shown). Additional plies may be laid, diffused with the solvent 114, and debulked several times to form the final CMC article. In one example, the CMC article may include 30-50 ply layup steps and 8-12 debulking steps to form the final CMC article.

Figure 4:
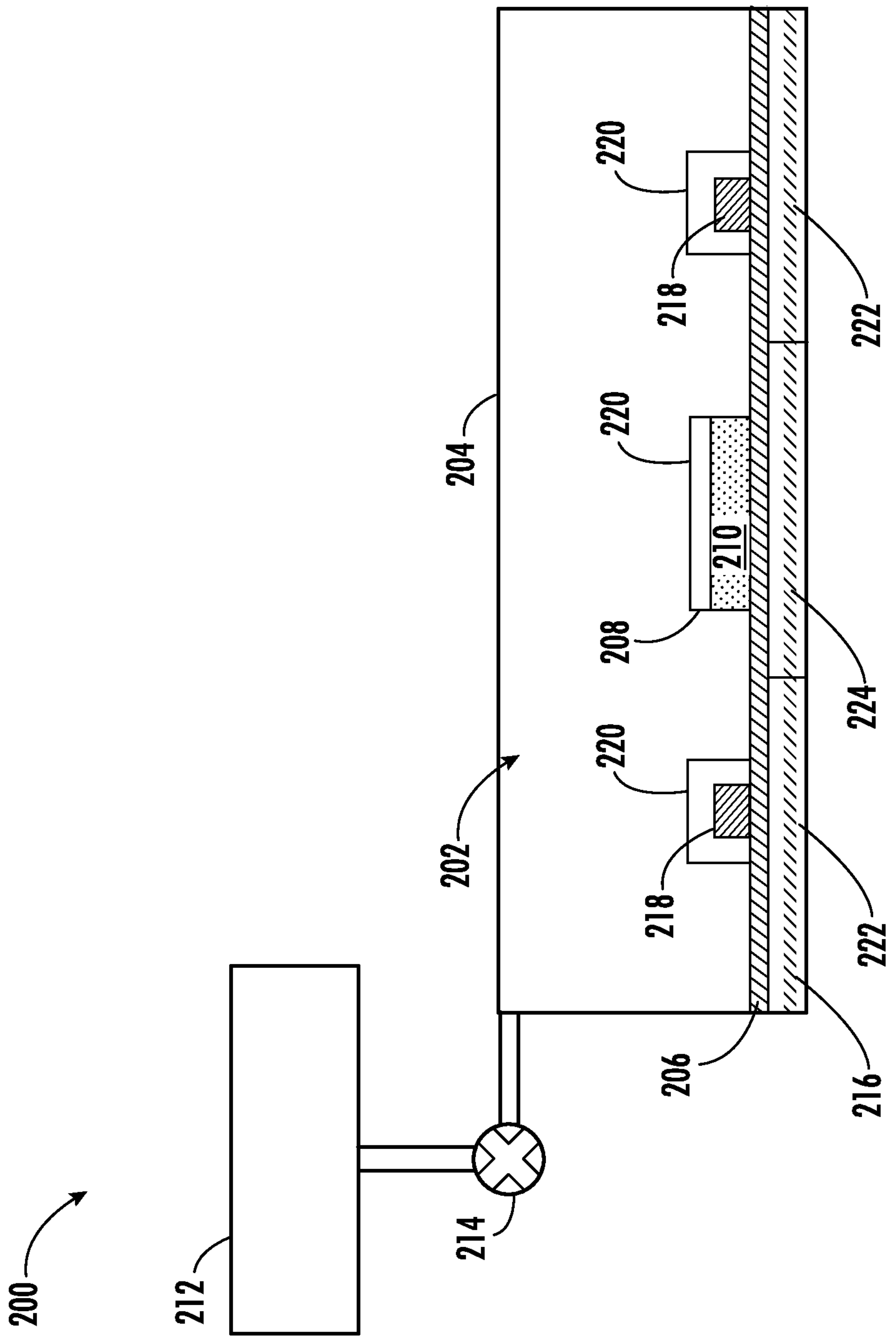
FIG. 4 is a side, cross-sectional view of another exemplary system for forming a CMC article.
Figure 5:
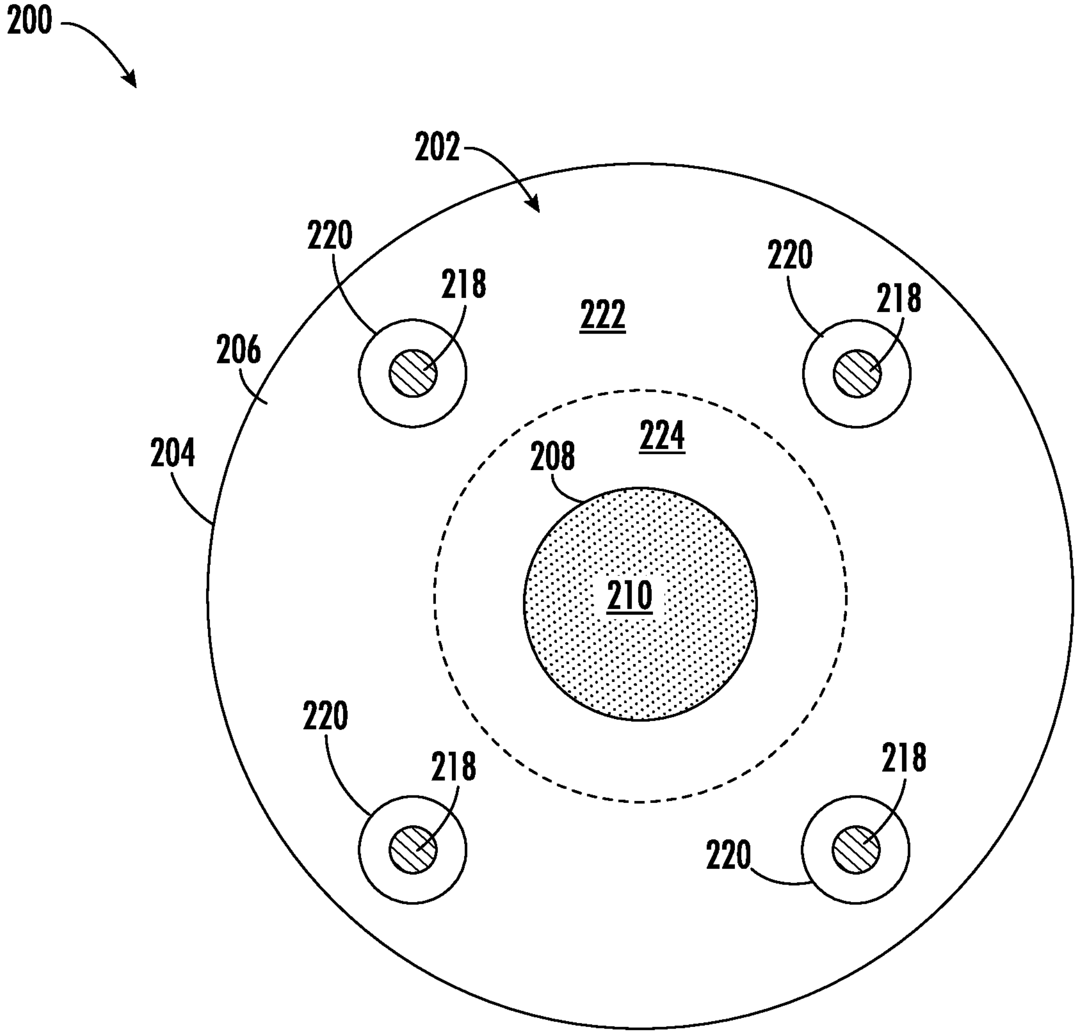
FIG. 5 is a top-down view of the exemplary system of FIG. 4.

With reference to FIGS. 4-5, another system 200 for forming a CMC article is shown. FIG. 4 shows a side view of the system 200, and FIG. 5 shows a top-down cross-sectional view of an enclosure 202 of the system 200. The exemplary system of FIGS. 4-5 may include some components that are similar to components of the exemplary system 100 of FIG. 2. To clarify the specific components used for each of the systems 100, 200, components of the systems 100, 200 are differentiated with a separate numeral even when sharing a common name and a common function.

Referring specifically to FIG. 4, the system 200 includes the enclosure 202 defined in a vacuum chamber 204, a platform 206 positioned within the vacuum chamber 204, and a solvent supply 208 disposed within the vacuum chamber 204 to communicate solvent 210 to the vacuum chamber 204. In certain embodiments, the system 200 may include one or more of: a vacuum pump 212 with a valve 214 in fluid communication with the vacuum chamber 204, and a heater 216 in thermal communication with the platform 206 and the solvent supply 208. By placing the solvent supply 208 in the vacuum chamber 204 with one or more preforms 218 laid up on the platform 206, the solvent 210 evaporates from the solvent supply 208 into the air within the vacuum chamber 204 and diffuses into the preforms 218.

The vacuum chamber 204 may include one or more receptacles 220 disposed on the platform 206. The preforms 218 and the solvent 210 are housed in the receptacles 220, such as circular trays as shown in FIG. 5. The receptacle 220 that includes the solvent 210 is the "solvent supply 208" in this exemplary embodiment. The receptacles 220 allow preforms 218 to be introduced and removed from the enclosure 202, allowing for rapid diffusion of a plurality of preforms 218 with minimal downtime.

When using the vacuum pump 212 to drive diffusion of the solvent 210, the vacuum pump 212 evacuates air from the vacuum chamber 204 to a specified vacuum pressure. As described above, the vacuum pressure is determined initially to be greater than the equilibrium vapor pressure of the solvent 114 above the preforms 124 (at the specified solvent content). The valve 214, when open, allows the vacuum pump 212 to evacuate the air, and when closed, maintains the vacuum pressure in the vacuum chamber 204.

When using the heater 216 to drive diffusion of the solvent 210, the heater 216 is disposed beneath the platform 206 to heat the preforms 218 and the solvent supply 208. The heater 216 of FIGS. 4-5 includes two heating zones that may be independently controlled. An outer heating zone 222 heats a region of the platform 206 on which the receptacles holding the preforms 218 are located. An inner heating zone 224 heats a region of the platform 206 on which the solvent supply 208 is located. By having different heating zones, the preforms 218 and the solvent supply 208 may be heated to different temperatures. As discussed above with respect to FIG. 3, heating the solvent 210 and the preforms 218 to different temperatures to equalize the vapor pressures may improve diffusion of the solvent 210 into the preforms 218.

Alternatively, the heater 216 may heat the preforms 218 and the solvent 210 to the same temperature. It will be appreciated that the heater 216 may include a different number of heating zones, such as a specific heating zone for each receptacle 220 to heat each preform 218 individually or a single heating zone to heat all of the receptacles 220 together.

Additionally or alternatively, the solvent 114, 210 in the solvent supply 112, 208 may differ from the solvent 114, 210 in the enclosure 110, 202. That is, the solvent 114, 210 in the enclosure 110, 202 may be a first solvent at a first vapor pressure, and the solvent 114, 210 in the solvent supply 112, 208 may be a second solvent at a second vapor pressure. The second solvent may be chosen to be a mixture of two or more different chemicals. For example, the first solvent may be pure isopropyl alcohol, and the second solvent may be a mixture of isopropyl alcohol and furfuryl alcohol. In such a form, the solvent supply 112, 208 and the enclosure 110, 202 may not need to be heated because the different vapor pressures of the first and second solvents drive the diffusion of the second solvent into the preforms 124, 218.

Figure 6:
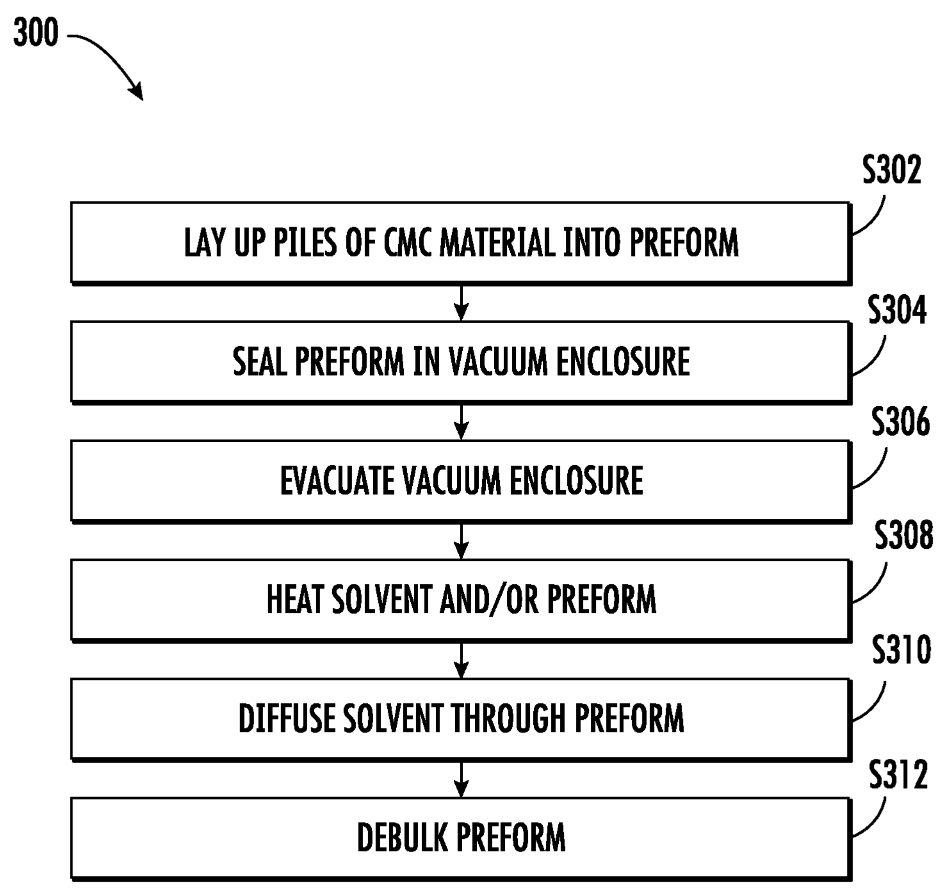
FIG. 6 is a block diagram of an exemplary method for forming a CMC article.

Referring now to FIG. 6, a flow diagram of a method 300 of forming a CMC article in accordance with an exemplary aspect of the present disclosure is provided. The method 300 of FIG. 6 may be utilized to form one or more of the exemplary articles described above with reference to FIG. 1. Accordingly, it will be appreciated that the method 300 may generally be utilized to form a CMC article for a gas turbine engine. However, in other exemplary aspects, the method 300 may additionally or alternatively be utilized to form CMC articles for other applications.

At a step (302), the method 300 includes laying up a plurality of plies of a CMC material. As described above, the plies are laid up on a platform to form a preform. The platform may be part of a tool base on which the CMC article is formed. The platform may be disposed in an enclosure, such as a vacuum chamber, or the platform may form the enclosure with a bag.

At a step (304), the method 300 includes sealing the preform in the enclosure. To seal the plies, the bag may be fixed to the platform to form a seal that surrounds the preform. Alternatively, when the enclosure is the vacuum chamber, a lid of the vacuum chamber may be closed to seal the preform. As described above, the enclosure is in fluid communication with a solvent supply that provides solvent to the preform in the enclosure.

At a step (306), the method 300 includes evacuating the enclosure to a specified vacuum pressure. As described above, evacuating the enclosure may include actuating a vacuum pump to evacuate air from the enclosure. The specified vacuum pressure may be determined based on a vapor pressure of the solvent in the solvent supply, a vapor pressure of solvent in the preform, or both. It will be appreciated that, when diffusion of the solvent is driven only by heating or by solvent composition, step (306) may be omitted.

At a step (308), the method 300 includes heating the solvent supply, the preform, or both. As one example, a first heater may be actuated to heat the solvent in the solvent supply to a first temperature, and a second heater may be actuated to heat the preform to a second temperature that is different than the first temperature. Heating the preform may include heating the platform on which the preform is laid up. Heating the solvent supply and the preform may improve solvent flow between the solvent supply and the enclosure. It will be appreciated that, when diffusion of the solvent is driven only by adjusting the vacuum pressure or by solvent composition, step (308) may be omitted.

At a step (310), the method 300 includes diffusing the solvent to or from the solvent supply through the preform. At the vacuum pressure, a certain amount of the solvent evaporates from the solvent supply and the preform. The evaporated solvent is transmitted to or from the solvent supply and to or from the enclosure to reach an equilibrium state. More specifically, the evaporated solvent may diffuse into the preform to provide the preform with a specified amount of solvent that is based on the vapor pressure of the solvent. The platform may include a breather that transmits the solvent from the solvent supply to the preform.

At a step (312), the method 300 includes, after diffusing the solvent through the preform, evacuating the enclosure to a second vacuum pressure to debulk the preform. Debulking the preform removes air trapped between the plies and compresses the preform to a smaller size. After debulking the preform, the enclosure may be unsealed, and the method 300 may return to the step (302) to lay up a second plurality of plies on the preform. The method 300 may be repeated several times to lay additional plies to form a new preform, to diffuse solvent into the new preform, and to debulk the preform to form the CMC article.

Additional finishing steps not shown in the method 300 may be performed after debulking the preform. For example, the CMC article may be subject to an autoclaving step to burn out solvents and further compact the plies in the debulked preform. Alternatively or additionally, the CMC article may undergo a pyrolyzing step to convert remaining organic material into char. Further, the CMC article may undergo a melt infiltration or chemical vapor infiltration step to infiltrate the article with silicon, which reacts with carbon in the plies to form a silicon carbide matrix.

Further aspects are provided by the subject matter of the following clauses:

A method for forming a ceramic matrix composite (CMC) article includes laying up a plurality of plies of a CMC material, sealing the plurality of plies in an enclosure that is in fluid communication with a solvent supply, the solvent supply including a volume of a solvent and diffusing the solvent to or from the solvent supply through the plurality of plies.

The method of any of the previous clauses, further including heating the solvent supply to a first temperature and heating the plurality of plies to a second temperature, the first temperature being different than the second temperature.

The method of any of the previous clauses, wherein laying up the plurality of plies further includes laying up the plurality of plies on a heater, wherein heating the plurality of plies further includes actuating the heater to heat the plurality of plies.

The method of any of the previous clauses, wherein diffusing the solvent from the solvent supply further includes transmitting the solvent to or from the solvent supply to the enclosure across a breather.

The method of any of the previous clauses, wherein diffusing the solvent further includes actuating a vacuum pump to evacuate air from the enclosure.

The method of any of the previous clauses, wherein laying up the plurality of plies further includes laying up the plurality of plies on a tool base having a platform positioned within the enclosure.

The method of any of the previous clauses, further including heating the platform to heat the plurality of plies.

The method of any of the previous clauses, wherein the solvent supply is disposed within the enclosure.

The method of any of the previous clauses, further including, after diffusing the solvent through the plurality of plies, evacuating the enclosure to a vacuum pressure to debulk the plurality of plies.

The method of any of the previous clauses, wherein the plurality of plies is a first plurality of plies, and wherein the method further includes, after debulking the plurality of plies, unsealing the plurality of plies from the enclosure and laying up a second plurality of plies on the first plurality of plies.

The method of any of the previous clauses, wherein laying up the plurality of plies further includes laying up the plurality of plies on a platform, wherein sealing the plurality of plies in the enclosure further includes fixing a bag to the platform to form a seal, wherein the seal surrounds the plurality of plies.

An apparatus configured to perform the method of any of the previous clauses.

A system for forming a ceramic matrix composite (CMC) article includes a enclosure, a solvent supply in fluid communication with the enclosure, a heater in thermal communication with the solvent supply, and a tool base having a platform positioned within the enclosure for receiving a plurality of plies of a CMC material.

The system of any of the previous clauses, wherein the enclosure is defined in a vacuum chamber.

The system of any of the previous clauses, wherein the solvent supply is disposed in the vacuum chamber.

The system of any of the previous clauses, further including a vacuum pump in fluid communication with the vacuum chamber.

The system of any of the previous clauses, wherein the heater is a first heater, and wherein the system further includes a second heater positioned to be in thermal communication with the plurality of plies when the plurality of plies is positioned on the platform, wherein the first heater is configured to heat the solvent in the solvent supply to a first temperature and wherein the second heater is configured to heat the plurality of plies to a second temperature that is different than the first temperature.

The system of any of the previous clauses, further comprising a bag secured to the platform, wherein the enclosure is a region between the bag and the platform.

The system of any of the previous clauses, wherein the heater is a first heater, and wherein the system further includes a second heater in thermal communication with the platform and configured to be in thermal communication with the plurality of plies when the plurality of plies is laid up on the platform.

The system of any of the previous clauses, wherein the bag forms a seal with the platform, and wherein the seal surrounds the plurality of plies on the platform.

The system of any of the previous clauses, further including a breather disposed between the plurality of plies and the platform, the breather being in fluid communication with the solvent supply.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for forming a ceramic matrix composite (CMC) article, the method comprising:

laying up a plurality of plies of a CMC material;

sealing the plurality of plies in an enclosure that is in fluid communication with a solvent supply, the solvent supply including a volume of a solvent; and evaporatively diffusing the solvent to or from the solvent supply through the plurality of plies.

2. The method of claim 1, further comprising:

heating the solvent supply to a first temperature and heating the plurality of plies to a second temperature, the first temperature being different than the second temperature to cause diffusion of the solvent.

3. The method of claim 2, wherein laying up the plurality of plies further comprises laying up the plurality of plies on a heater, wherein heating the plurality of plies further comprises actuating the heater to heat the plurality of plies.

4. The method of claim 1, wherein diffusing the solvent from the solvent supply further comprises transmitting the solvent to or from the solvent supply to the enclosure across a breather.

5. The method of claim 1, wherein diffusing the solvent further comprises actuating a vacuum pump to evacuate air from the enclosure.

6. The method of claim 1, wherein laying up the plurality of plies further comprises laying up the plurality of plies on a tool base having a platform positioned within the enclosure.

7. The method of claim 1, further comprising heating the platform to heat the plurality of plies.

8. The method of claim 1, wherein the solvent in the solvent supply has a specified composition such that, the solvent diffuses to or from the solvent supply through the plurality of plies upon sealing the plurality of plies in the enclosure.

9. The method of claim 1, further comprising:

after diffusing the solvent through the plurality of plies, evacuating the enclosure to a vacuum pressure to debulk the plurality of plies.

10. The method of claim 9, wherein the plurality of plies is a first plurality of plies, and wherein the method further comprises:

after debulking the plurality of plies, unsealing the plurality of plies from the enclosure and laying up a second plurality of plies on the first plurality of plies.

11. The method of claim 1, wherein laying up the plurality of plies further comprises laying up the plurality of plies on a platform, wherein sealing the plurality of plies in the enclosure further comprises fixing a bag to the platform to form a seal, wherein the seal surrounds the plurality of plies.

* * * * *